United States Patent

[11] 3,592,542

| [72] | Inventors | Helmut Käufer<br>Metzkausen, Upper Bavaria, Mettmann;<br>Erich Burger, Unterhaching, Munich;<br>Hans-Peter Huber, Munich, all of,<br>Germany |
|---|---|---|
| [21] | Appl. No. | 739,897 |
| [22] | Filed | June 11, 1968 |
| [45] | Patented | July 13, 1971 |
| [73] | Assignee | Agfa-Gevaert AG<br>Munich, Germany |
| [32] | Priority | Nov. 20, 1964 |
| [33] | | Germany |
| [31] | | A 47 647 |
| | | Continuation of application Ser. No.<br>508,258, Nov. 17, 1965, now abandoned. |

[54] COPYING APPARATUS WITH LENTICULAR OPTICAL SYSTEM
27 Claims, 6 Drawing Figs.

[52] U.S. Cl........................................ 355/50,
350/167, 350/213, 350/272, 353/30, 355/51,
355/54
[51] Int. Cl.................................................. G03b 27/50
[50] Field of Search.......................................... 355/50, 51,
54; 350/167, 213, 272; 353/30

[56] References Cited
UNITED STATES PATENTS

| 3,060,805 | 10/1962 | Brumley | 88/24 X |
| 3,060,806 | 10/1962 | Lewis et al. | 88/24 X |
| 3,125,013 | 3/1964 | Herrick, Jr. et al | 88/24 X |
| 3,130,631 | 4/1964 | Murata | 88/24 |
| 3,175,481 | 3/1965 | Lahr | 88/24 X |
| 3,194,142 | 7/1965 | Black, Jr. | 88/24 X |
| 3,204,543 | 9/1965 | O'Keeffe | 88/24 X |
| 3,241,438 | 3/1966 | Frank | 88/24 |
| 3,264,933 | 8/1966 | Frank | 88/24 |
| 3,290,988 | 12/1966 | Murata | 88/24 |
| 3,241,438 | 3/1966 | Frank | 355/50 |

FOREIGN PATENTS
| 676,947 | 6/1939 | Germany | |

Primary Examiner—Samuel S. Matthews
Assistant Examiner—Richard A. Wintercorn
Attorney—Michael S. Striker ABSTRACT: An optical system composed of pairs of lenticular bars, each of which has a row of lens portions with spherical and planar faces, scans successive strips of an original which moves relative to a copy sheet. Strip-shaped erected images of the scanned strips are projected onto successive strip portions of the copy sheet where a complete image of the original is formed.

INVENTOR.
HELMUT KÄUFER
BY  ERICH BURGER
HANS-PETER HUBER

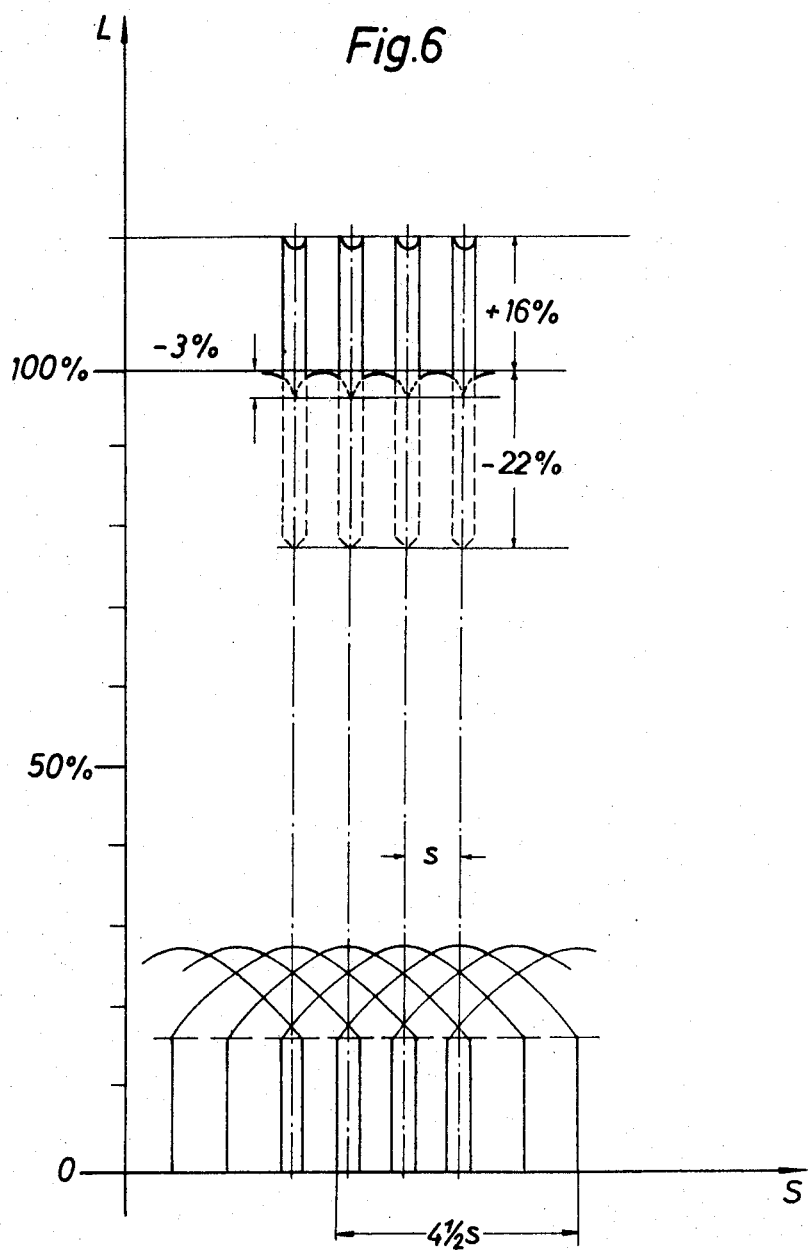

COPYING APPARATUS WITH LENTICULAR OPTICAL SYSTEM

CROSS-REFERENCE TO RELATED APPLICATIONS

The present application is a continuation of our copending application Ser. No. 508,258, now abandoned.

The present invention relates to a copying apparatus with a lenticular optical system, and more particularly to an apparatus in which portions of an original or master are successively imaged on a radiation-sensitive copy sheet during relative movement between the optical system, and the original and copy sheet.

The successive copying of strip-shaped portions of the original has, as compared with the copying of the entire original at a time, the advantage that the image angle of the optical system can be substantially smaller, and that the optical system can be simplified. The image angle does not have to be any more at least equal to the diagonal of the image format, but depends only on the narrow side of the same. However, known copying apparatus still requires an optical path which is hardly below twice the diagonal of the image format.

In accordance with the invention, a lenticular optical system is used for a copying apparatus. The lenticular optical system includes lenticular means, composed of a row of lens elements producing image sections which together form a complete continuous image, and may even overlap.

The total image is produced in an apparatus according to the present invention by the successively produced strip-shaped image portions, each of which consists of image sections produced by lens elements of the lenticular means. The lens elements have at least one refractive surface portion of positive power and refraction, and in a preferred embodiment, two positive lenticular means are provided which are respectively located in front and in the rear, and have a common center of projection located outwardly of the space between the front and rear lenticular means. In such an arrangement, the optical paths can be reduced practically to any desired extent, while the illuminating system can be directly connected with the optical system, even if several lenticular optical systems are provided in a copying apparatus.

A particularly intense and uniform illumination of the copy sheet, and a compact construction results, if a rod-shaped source of light is disposed parallel to an elongated lenticular optical system constructed of parallel lenticular bars, each of which is composed of a row of lenticular portions. The optical path of the lens elements, should not substantially exceed the diameter of the rod-shaped source of light.

In such an arrangement, the original and copy sheet can be spaced a distance corresponding to the diameter of the rod-shaped source of light located between the same, and as a consequence, the dimensions of a contact printer can be obtained without the disadvantage that opaque originals, which most frequently occur, can be copied only on transparent copy sheets with great contrast losses. A particular advantage for copying apparatus which require development in a liquid, resides in that the original is always securely separated from the copy sheet, so that the original cannot accidentally be transported into the developing liquid.

A lenticular optical system according to the present invention composed of very small lens portions having correspondingly short glass paths, and directly connected with a source of radiation, is particularly suited for heat rays, in which event the lenticular means are, for example, composed of small cubes or prisms consisting of glass, quartz, fluor spar, or rock salt provided with at least one refractive curved surface.

In order to obtain an unobjectionable total image of the image sections produced by the lens elements, the same may differ from the theoretically correct value, distances in the magnitude of the permissible image defects. This is obtained in an advantageous manner by combining the refractive surfaces of lens portion in a lenticular bar, which preferably consists of a synthetic plastic material. Such a plastic lenticular bar is composed, for example, of a single row of lens portions, permitting maintaining of the desired distances between the lens portions with an accuracy of a few hundredth millimeter, which is in the order of magnitude of image defects considered permissible in optical systems serving the purpose of the invention. Due to the relative smallness of the lens surfaces, the same can be very accurately formed even of synthetic plastic material, particularly if neutral portions between the lens elements, which do not participate in the formation of the image, take up the shrinkage occurring during the making of the lenticular bars.

It is advantageous to separate the bundles of rays passing through adjacent groups or pairs of lens elements, and for this purpose light-guiding means, such as perforated diaphragms, field lenses, or glass fiber rods are provided.

It is one object of the invention to provide a copying apparatus with a lenticular optical system which is designed so that the dimensions of the copying apparatus are very small.

Another object of the invention is to provide a copying apparatus with a lenticular optical system obtaining a uniform and highly efficient illumination of the original, and a uniform light distribution on the copy sheet.

Another object of the invention is to provide a copying apparatus with a lenticular optical system consisting of a synthetic plastic material.

Another object of the invention is to provide a copying apparatus with a lenticular optical system which efficiently operates with light rays and heat rays.

Another object of the invention is to provide a copying apparatus having an optical system which can be inexpensively manufactured of a synthetic plastic material, but has small image defects and aberrations.

With these objects in view, a copying apparatus according to one embodiment of the invention comprises first supporting means having opposite spaced support members for supporting an original and a radiation-sensitive copy sheet, respectively; second supporting means located between said support members; and a lenticular optical system mounted on the second supporting means and comprising first and second lenticular means located in the front and in the rear and being respectively composed of first and second lens elements.

Preferably, a third lenticular means is located between the first and second lenticular means in the intermediate image plane.

During relative movement between the first and second supporting means, pairs of the first and second lens elements, or groups of first, second and third lens elements, cooperate optically with each other so that the optical system scans during relative movement between the first and second supporting means, successive strip portions of the original and projects images of scanned strip portions onto corresponding successive strip portions of the copy sheet. Each pair or group of lens elements projects images of parts of the scanned strip portions onto the copy sheet so that on each strip portion of the copy sheet a continuous complete image of the respective scanned strip portion is formed, while all successive strip portions on the copy sheet form a complete image of the original.

At least one lenticular means has positive power of refraction, and each lenticular means is preferably constructed of two lenticular bars, each of which has a single row of lens portions, a pair of lens portions forming a lens element.

A uniform continuous image, at different ratios of magnification, can be obtained by suitably selecting the distances between the lens elements of the front and rear lenticular means, the distance between the object plane and the image plane, the distance between the front principal point and the object plane, and the distance between the rear principal point and the image plane.

In accordance with another feature of the invention, each lenticular means is constructed of at least two lenticular bars of different power of refraction, or having different indices of dispersion, or both. The lenticular means may be corrected in the manner usual for standard single objectives. In this manner, inexpensively manufactured lenticular bars can be used for producing highly efficient and accurate optical systems.

In accordance with one embodiment of the invention, the original and the copy sheet move relative to each other at a speed which corresponds to the ratio of magnification of the optical system. A reversed image and print is obtained, which has to be copied again to produce a true image. The corresponding optical system is consequently suitable for making positives of printing forms, negatives in the silver salt diffusion process, for exposing the light-sensitive layer of the copy sheet in an electrophotographic powder copying process, and for making copies by heat rays on a transparent copy sheet.

A particularly simple construction with a magnification ratio of 1 is obtained if the entire optical system together with the source of light, moves relative to a stationary original and stationary copy sheet, or if the copy sheet and the original are transported at the same speed relative to the optical system and to the source of light. Instead of providing two transporting devices for transporting the original and the copy sheet at different speeds, only one supporting means has to be moved, for example by a spring motor controlled by a delay mechanism determining the time of exposure. A regulatable drive motor may also be used for transporting the optical system.

An immediately legible print can be obtained by using the known slit image, and movement of original and copy sheet in opposite directions. Along the slit, the lights of several groups of lens elements are added, so that a far better light efficiency is obtained than in the known slit image constructions with fiber optical elements.

However, it is preferred to use an odd number of mirrors for producing a true image on the copy sheet so that no further copying is required. For example, the optical system may be provided with one mirror between two lenticular means for deflecting the rays of light 90°. In such an arrangement, it is particularly advantageous to mount transporting means, the lenticular optical system, the sources of light, and the mirror, on a slide which is movable relative to a stationary original.

For example, the supporting means of the copy sheet may be attached by a gripper to a transporting drum, and transported by the same past a stationary original. In the event of a magnification ratio of 1:1, the generatrix of the transporting drum remote from the original remains at rest in relation to the original and to the stationary housing, so that a holding device may be provided for holding the leading end of the copy sheet. The copy sheet is then inserted at the beginning of the exposure about the transporting drum, which in this case is substantially smaller, held by the holding device, and is after the exposure located directly opposite the original.

In another embodiment of the invention, the optical system includes three mirrors deflecting the rays 60° so that original and copy sheet can be located in parallel planes which are spaced a small distance from each other.

Another construction for producing a true, nonreversed image on a copy sheet which is parallel to the original, uses an even number of mirrors by which the image of the original is formed on the side of the copy sheet remote from the original.

Due to the fact that strip-shaped portions of the original are scanned, very narrow, bar-shaped mirrors can be used, so that the distance between original and copy sheet remains small.

As in the reflex copying process, each image point of the copy is located directly below the corresponding object point of the original. In contrast to the conventional reflex copying processes, the copy is legible from the same side as the original, even if a nontransparent copy carrier is used. Original and copy sheet can remain stationary, while the optical system is moved, and the area of the optical system has to exceed the area of the largest original to be copied, only in the direction of movement of the optical system by the width of the bar-shaped mirror.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 3:
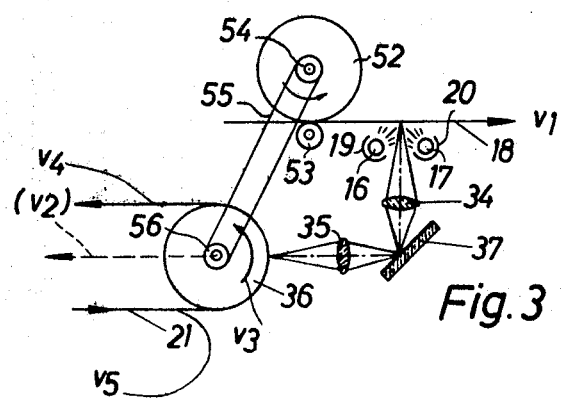
Figure 4:
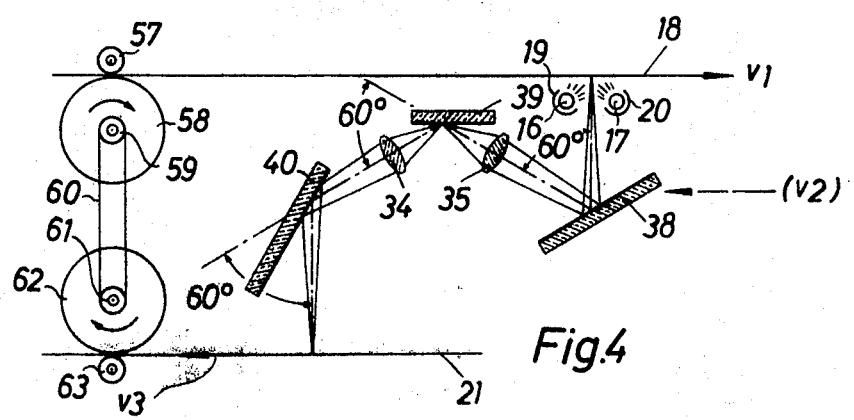
Figure 5:
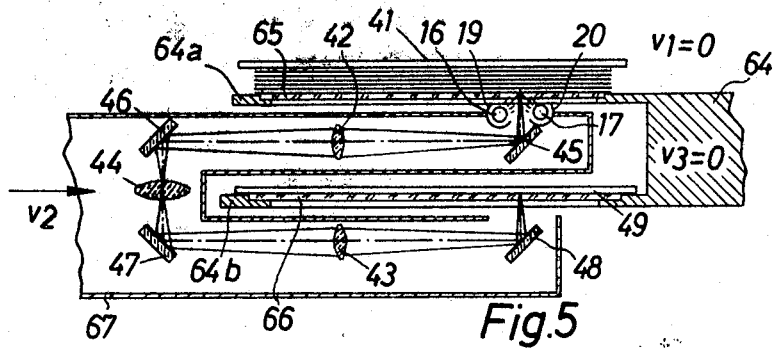

FIGS. 3, 4, and 5 are fragmentary schematic views illustrating the optical system of three modified embodiments of the invention; and FIG. 6 is a diagram illustrating the distribution of light in an apparatus according to the invention.

Figure 1:
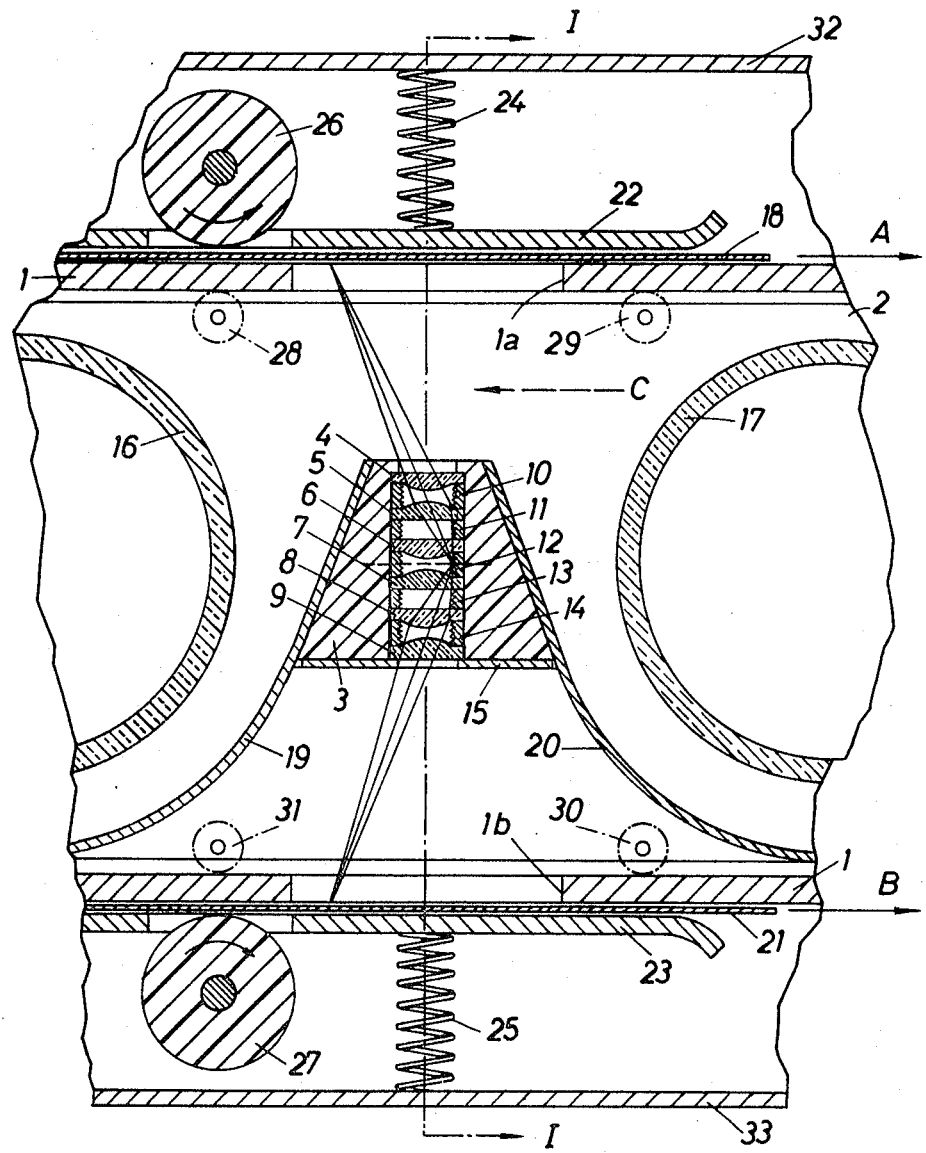
FIG. 1 is a fragmentary sectional view illustrating one embodiment of the invention.
Figure 2:
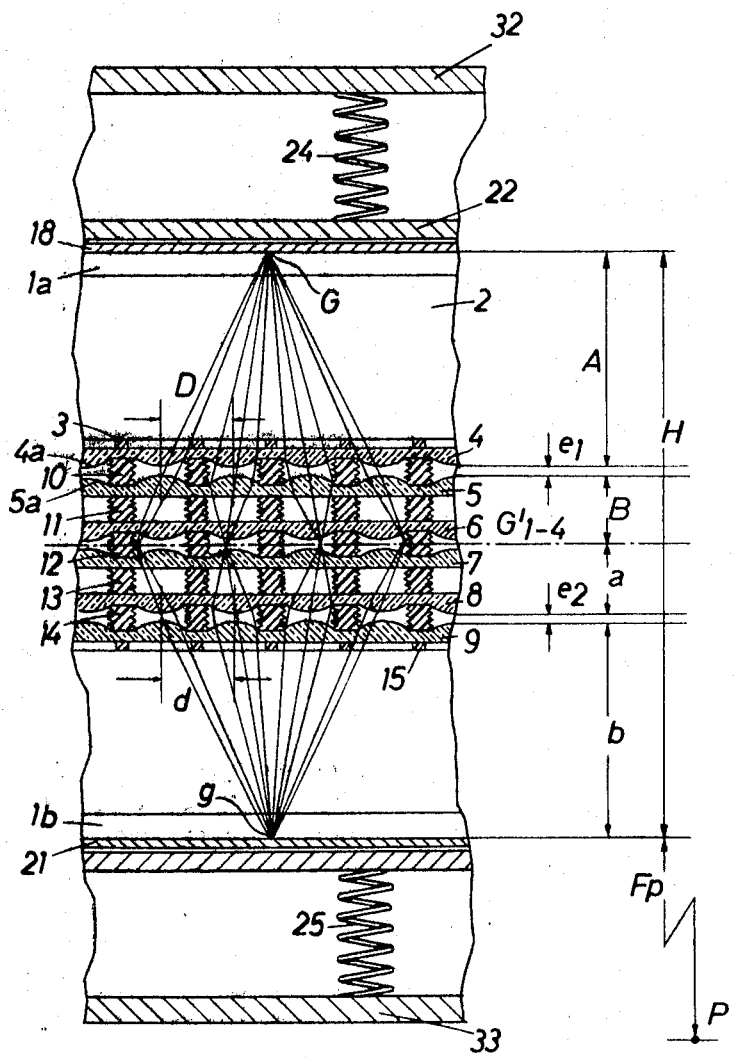
FIG. 2 is a fragmentary cross-sectional view taken on line I-I in FIG. 1.

Referring now to the drawings, and more particularly to the embodiment of FIGS. 1 and 2, a supporting means 2 is mounted on stationary horizontal frame walls 1, and may be movable relative to the same by means of rollers 28 to 31, shown in chain lines. Between the lateral walls of supporting means 2, a substantially bar-shaped holder 3 is mounted which supports six lenticular bars 4 to 9 which are spaced from each other by spacing members 10 to 14 which engage the edge portions of lenticular bars 4 to 9. A metal cover plate 15 holds the lenticular bars in position in a recess of holder 3, and has openings in the region of the lowermost lenticular bar of the lenticular optical system 4 to 9.

Each lenticular bar is composed of a single row of lens portions forming a strip-shaped lenticular surface and a planar surface on opposite sides, each lens portion having a spherical refractive surface portion and a planar surface portion on opposite sides. The lenticular bars 4 to 9 have the same number of lens portions, and the spherical surfaces of pairs of lens portions of pairs of lenticular bars confront each other to form lens elements. Thus, lenticular means 4, 5 is composed of a first row of lens elements, lenticular means 6, 7 is composed of a row of second lens elements, and lenticular means 8, 9 is composed of a row of third lens elements. A first, a second and a third lens element form a group optically cooperating with each other. The edge portions on which the spacing members 10 to 14 abut, may be masked, or otherwise rendered dull to reduce reflections. Opposite strip-shaped lenticular surfaces, for example, 4a and 4b of the lenticular bars 4 and 5, are composed of rows of spherical refractive surface portions of the lens portions of the respective lenticular bars.

A pair of rod-shaped sources of light or other radiation, for example heat rays, is also mounted between the frame walls of supporting means 2, and are shown to have transparent tubes located on opposite sides of holder 3.

Curved reflector sheets 19 and 20 have end portions secured to holder 3, and curved portions extending on one side of tubes 16 and 17 to reflect the light toward an opening 1a in the first frame wall 1, while shielding an opening 1b in a second frame wall 1. An original or master 18 is placed on top of wall 1, covering opening 1a, and a copy sheet 21 is placed below opening 1b, covering the same. Opening 1a extends across the entire width of the original 18 so that a corresponding portion of the same is illuminated by sources of light 16 and 17.

Original 18 and copy sheet 21 are respectively urged toward frame walls 1 by pressure means including pressure plates 22, 23, and springs 24, 25 which respectively abut a housing top plate 32, and a bottom plate 33 which may be provided with supporting legs, not shown.

Transporting and supporting rollers 26, 27 engage the original and a copy sheet, respectively, through openings in pressure plates 22, 23, so that original 18 and copy sheet 21 can be simultaneously transported in the parallel directions of arrows A and B along wall 1 whereby successive strip-shaped portions of original 18 are illuminated through opening 1a, and corresponding strip-shaped portions of copy sheet 21 are exposed to light rays passing through the lenticular optical system 4 to 9 and forming on strip-shaped portions of the copy sheet, stripp-shaped images of strip-shaped portions of the original 18 scanned through opening 1a by the lenticular optical system.

Instead of moving original and copy sheet simultaneously relative to the optical system, it is also possible to move supporting means 2 with the optical system relative to the original and copy sheet, and to supporting members 26, 27 in the direction of the arrow C by means of rollers 28 to 30.

The lenticular bars 3 to 9 preferably consist of a synthetic plastic material, such as plexiglass. THe lens elements of lenticular means 4, 5, and of lenticular means 8, 9 deflect the rays of light reflected by the illuminated original 18, and the lens elements of the intermediate lenticular means 6, 7 act as field lenses. Confronting surfaces, for example 4a, 5a of a pair of lenticular bars are composed of spherical convex refractive surface portions, and flat intermediate portions engaged by spacing members 10. The outwardly facing surfaces of each pair of lenticular bars are planar, so that the lenticular bars can be easily manufactured of a synthetic plastic material, but have good optical properties, particularly low distortion and astigmatism. If it is desired to further improve the quality of the optical system, it is possible to provide the outwardly facing surfaces of the lenticular bars with refractive if desired aspherical refractive lens surfaces. In this event, the lens elements could be constructed as meniscus lenses and groups of lens elements of the three lenticular means would form a periscopelike objective.

Color aberrations can be corrected by making the lenticular bars of materials having different indices of refraction or dispersion, or both, or the lenticular bars may have, respectively, negative or positive power of refraction. A further improvement of the optical qualities of the system can be obtained by providing more than two lenticular bars for each lenticular means, forming a triplet or uncemented double anastigmat.

The optically neutral, marginal portions surrounding each curved refractive surface provide not only an area for the abutment of the spacing members 10 to 14, but have the advantage that shrinkage of the material can be concentrated in the zones by selectively cooling the same.

As shown in FIG. 2, in which a ratio of 1:1 between the original and the image is assumed, the central rays form similar triangles so that an object point G of the original is imaged on several points $G'_1$ to $G'_n$ in the intermediate plane, and is imaged in a single image point $g$ in the image plane of the copy sheet 21. The conditions of similarity between the triangles are valid also for finite distances $e_1$ and $e_2$ of the principal points. The center of projection P, in which the axes of the several groups of lens elements intersect, is located in infinity for a ratio of magnification $v$ equal to one. For this magnification ratio, the distance $D$ between adjacent lens elements of the front lenticular means 4, 5, is equal to the distance $d$ between adjacent lens elements of the rear lenticular means 8, 9. Any desired ratio of magnification can be expressed by the following equation:

1
$$\frac{D}{d} = \frac{H + F_p - A}{F_p + b}$$

wherein $H$ is the distance between the object plane and the image plane, $A$ is the distance between the object plane and the external perspective center or principal point of the front lenticular means 4, 5, $b$ is the distance between the image plane and the external perspective center or principal point of the rear lenticular means 8, 9, and $F_p$ is the distance between the image plane and the center of projection P.

Since the ratio of magnification can be mathematically expressed by the following equation 2
$$v = \frac{H + F_p}{F_p}$$

from which follows

2a
$$F_p = \frac{H}{v - 1}$$

the magnification ratio can be expressed by the following equation

3
$$\frac{D}{d} = \frac{v \cdot H - v \cdot A + A}{H + v \cdot b - b}$$

For given values of $v$, $H$, $A$, and $b$, the ratio of magnification $D/d$ can be determined at which a single object point is imaged by all groups of lens elements participating in the formation of the image, in coinciding image points, in other words in a single image point $g$.

The lenticular optical system described with reference to FIGS. 1 and 2 can be used in modified copying machines. The image may be formed on an offset cylinder which is rotated to move its surface past the opening 1b. The cylinder may carry a layer of light-sensitive material, if an electrophotographic powder printing system is used.

In the embodiment of FIG. 3, the original 18 is pressed by a transporting roller 52 against counter roller means 53 and moved at a speed $v_1$ relative to the lenticular optical system which includes a pair of lenticular means 34, 35, each composed of a single row of biconvex lens elements having optical axes defining an angle of 90° with other and intersecting in the reflecting surface of a mirror 37. The copy sheet 21 is transported at a speed $v_3$ by a transporting drum 36 which is positioned so that an image of a scanned portion of original 18 is formed on a corresponding portion of copy sheet 21. Transporting drum 36 drives transporting roller 52 over pulleys 56, 54 and a cord loop 55. If the diameters of pulleys 56, 54 have the same ratio as the diameters of rollers 36, 52 the original 18 moves at the same speed as copy sheet 21. Light sources 16, 17 with reflectors 18, 19 illuminate the original. While the arrangement of FIG. 1 produces a reversed image, the mirror provided in the embodiment of FIG. 3 results in a true image of the original on the copy sheet 21.

If the ratio of magnification of the system is greater than one, the speed of movement $v_3$ must be different from the speed $v_1$ of the original in order to obtain the same magnification in longitudinal and transverse directions of the copy sheet. This may be expressed by the equation 4. $v_3 = v \cdot v_1$.

Instead of moving original 18, or in addition thereto, drum 36 may be moved together with the optical system relative to original 18 at a scanning speed $v_2$. In this event, the speed $v_3$ of the copy sheet can be mathematically expressed as follows 5. $v_3 = v \cdot v_1 (v \cdot v_2)$ The ends of a band-shaped copy sheet move then, respectively, at speeds $v_4$ and $v_5$ which are determined by the following equations 6. $v_4 = v \cdot v_1 (v \cdot v_2 + v_2)$ 7. $v_5 = v \cdot v_1 (v \cdot v_2 - v_2)$ If the magnification ratio $v$ is one, and the original is not moved, so that $v_1$ is equal to 0, $v_5$ becomes equal to zero.

In the embodiment of FIG. 4, two manually operated, or motor driven transporting rollers 58 and 62 press the original 18 and copy sheet 21, respectively, against rollers 57 and 63. Pulleys 59, 61 and a cord loop 60 connect the shafts of transporting rollers 58, 62. In the illustrated embodiment, original and copy sheet move at the same speed, but if the diameters of the pulleys and transporting rollers are different, the speeds of the original and copy sheets are different.

In the embodiment of FIG. 4, the optical system includes two lenticular means 34 and 35 and three mirrors 38, 39, 40, each of which deflects the rays an angle of 60° so that the original 18 and the copy sheet 21 move in parallel planes at speeds $v_1$ and $v_3$. Assuming a speed $v_2$ of the optical system in a scanning direction opposite to the movement of original 18, the speed $v_3$ of the copy sheet is determined by the following equation 8. $v_3 = v \cdot v_1 (v_2 + v \cdot v_2)$ In the embodiment of FIG. 5, a support 64, which may be stationary, or movable at a speed $v_3$, has a frame portion 64a holding a glass plate 65, and a frame portion 64b holding a glass plate 66 on which original 41 and copy sheet 49, respectively, rest. The optical system is mounted in a housing 67 which is movable at a speed $v_2$. The stationary original 41, which may be an opened book, is scanned by the optical system moving at the speed $v_2$ with housing 67. The optical system includes four mirrors 45 to 48, each of which deflects the rays an angle of 90°, and three lenticular means 42, 43, 44. When the optical system is moved at the speed $v_2$, a true continuous image of the original is formed on the surface of the copy sheet 49 which faces in the same direction as the original.

This arrangement is advantageously used for producing a true, nonreversed image with an optical system including a single objective.

The diagram of FIG. 6 illustrates the distribution of light projected by the several groups of lens elements onto the image plane, the distances corresponding to the projection of the spacing between adjacent groups of lens elements. It is assumed that the individual light distributions up to the image angle to which the aperture is reduced, follows the known $\cos_4$ relation. The light ray bundles overlap to such a small extent that the total amount of light deviates only −3 percent from 100 percent maximum. Only at places at which aperture reductions overlap because they have a width of 4.5 spacings, in other words, not an integer multiple of the spacing, light peaks of +16 percent develop since at these places not four, but five light ray bundles overlap. For intermediate reduction of the aperture corresponding to 3.5 spacings, dark areas with brightness reduced by −22 percent will develop. Brightness differences in this magnitude are generally not noticeable so that the appearance of the picture is uniform. If fewer groups of lens elements cooperate to form an image point, variations of the illumination can be held below a noticeable amount by suitably selecting the intermediate aperture reduction and the spacing between lens elements, as is apparent from the diagram of FIG. 6.

It will be understood that each of the elements described above, or two or more together, may also find a useful application in other types of copying apparatus differing from the types described above.

While the invention has been illustrated and described as embodied in a copying apparatus provided with a lenticular optical system having positive power of refraction, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What we claim as new and desire to be secured by Letters Patent is:

1. A copying apparatus comprising, in combination, first supporting means having opposite spaced support members for supporting an original and a radiation-sensitive copy sheet, respectively; second supporting means located between said support members, at least one of said supporting means being movable relative to the other supporting means; and a lenticular optical system mounted on said second supporting means for scanning during relative movement between said first and second supporting means successive strip portions of said original and for projecting strip-shaped images of scanned strip portions onto corresponding successive strip portions of said copy sheet so as to form thereon a complete image of said original; said lenticular optical system including image forming means having at least one strip-shaped first lenticular surface and at least one strip-shaped second lenticular surface spaced from each other and being, respectively, composed of rows of first and second spherical refractive surface portions, pairs of said first and second surface portions optically cooperating with each other to project images of parts of said scanned strip portions onto said copy sheet so that on each strip portion of said copy sheet, a continuous complete image of the respective scanned strip portion is formed.

2. Copying apparatus as claimed in claim 1 wherein said image forming means includes lenticular bar means having said strip-shaped first and second lenticular surfaces.

3. Copying apparatus as claimed in claim 1 wherein said image-forming means includes bar means having a plurality of pairs of strip-shaped first and second lenticular surfaces respectively composed of rows of first and second optically cooperating refractive surface portions.

4. Copying apparatus as claimed in claim 1 wherein said image-forming means includes first and second lenticular bar means spaced from each other and having said first and second lenticular surfaces.

5. Copying apparatus as claimed in claim 1 wherein said image-forming means includes first and second lenticular bar means spaced from each other and having said first and second lenticular surfaces on one side thereof, respectively, the respective other sides of said first and second bar means having planar surfaces.

6. Copying apparatus as claimed in claim 1 wherein said image-forming means includes first and second lenticular bar means spaced from each other and having said first and second lenticular surfaces, and lenticular field lens bar means located between said first and second lenticular bar means and having two strip-shaped lenticular surfaces composed of rows of field lens surface portions.

7. Copying apparatus as claimed in claim 1 wherein said first and second lens surface portions have radii of curvature selected so that each pair has an intermediate image plane located between said first and second lens surface portions thereof whereby strip-shaped mirror images of the scanned strip portions are obtained.

8. Copying apparatus as claimed in claim 7 wherein said lenticular optical system includes an odd number of reflecting means so that a true copy is obtained.

9. Copying apparatus as claimed in claim 8 wherein one of said supporting members is a drum for deflecting the copy sheet or the original thereon an angle of 90°.

10. A copying apparatus as claimed in claim 1 wherein said support members are transporting rollers engaging said original and said copy sheet, respectively, for transporting the same relative to said second supporting means.

11. A copying apparatus as claimed in claim 1 including at least one source of light mounted on said second supporting means for illuminating said original, and means for shielding said copy sheet from said source of light.

12. A copying apparatus as claimed in claim 11 wherein said source of light includes at least one rod-shaped light-emitting member extending transversely to the direction of relative movement of said supporting means, and wherein the optical length of said pairs of first and second lens elements is substantially not greater than the diameter of said rod-shaped member.

13. A copying apparatus as claimed in claim 1 wherein said support members of said first supporting means are movable at different speeds relative to said second supporting means with said original and said copy sheet, respectively, and wherein said lenticular optical system has a ratio of magnification corresponding to the ratio of said different speeds.

14. A copying apparatus as claimed in claim 1 including a source of light and mirror means mounted on said second supporting means, and wherein said second supporting means is guided for movement along said first supporting means.

15. A copying apparatus as claimed in claim 1 wherein one of said supporting members supports said copy sheet on a surface facing away from said lenticular optical system, and wherein said lenticular optical system includes an even number of mirrors disposed to form said image of said original on said copy sheet.

16. A copying apparatus comprising, in combination, first supporting means having opposite spaced support members for supporting an original and a radiation-sensitive copy sheet, respectively; second supporting means located between said support members, said supporting means being movable relative to each other; and a lenticular optical system mounted on said second supporting means for scanning during relative movement between said first and second supporting means successive strip portions of said original and for projecting images of scanned strip portions onto corresponding successive strip portions of said copy sheet so as to form thereon a complete image of said original; said lenticular optical system comprising first and second lenticular means spaced from each other and being respectively composed of first and second lens elements, pairs of said first and second lens elements optically cooperating with each other to project images of parts of said scanned strip portions onto said copy sheet so that on each strip portion of said copy sheet, a continuous complete image of the respective scanned strip portion is formed.

17. A copying apparatus as claimed in claim 16 wherein each lenticular means has at least one refractive surface of positive power.

18. A copying apparatus as claimed in claim 16 wherein each of said first and second lenticular means includes a pair of bars each composed of at least one row of lens portions, pairs of said lens portions of said pairs of bars forming said first and second lens elements, respectively.

19. A copying apparatus as claimed in claim 16 wherein each lenticular means consists of a synthetic plastic material.

20. A copying apparatus as claimed in claim 16 wherein said first and second lens elements are arranged and constructed to have a common intermediate image plane located between said first and second lenticular means.

21. A copying apparatus as claimed in claim 16 wherein each of said lenticular means is composed of a single row of said lens elements.

22. A copying apparatus as claimed in claim 16 wherein each of said first and second lenticular means includes a pair of bars each composed of at least one row of spherical lens portions, pairs of said lens portions of said pairs of bars forming said first and second lens elements, respectively.

23. A copying apparatus as claimed in claim 16 and including a third lenticular means located intermediate said first and second lenticular means in an intermediate image plane and composed of third lens elements respectively optically cooperating with said pairs of first and second lens elements.

24. A copying apparatus as claimed in claim 23 wherein each of said lenticular means includes a pair of parallel lenticular members spaced from each other.

25. A copying apparatus as claimed in claim 24 wherein said lenticular members of each pair have confronting refractive surfaces composed of a plurality of convex refractive faces, said refractive faces being the refractive surfaces of said first, second and third lens elements.

26. A copying apparatus as claimed in claim 16 wherein said first lenticular means is located in front in the proximity of said original and said second lenticular means is located in the rear in the proximity of said copy sheet; wherein the distances $D$ between the optical axes of said first lens elements, the distance $A$ between the front principal point and the object plane, the distance $d$ between the optical axes of said second lens elements, the distance $b$ between the rear principal point and the image plane, the distance $H$ between object plane and image plane, and the ratio of magnification $v$ are selected in accordance with the equation $$\frac{D}{d} = \frac{v \cdot H - vA + A}{H + v \cdot b - b}$$

27. A copying apparatus as claimed in claim 16 wherein at least one of said lenticular means includes two lenticular members having lenticular portions forming together said lens elements of said lenticular means, said lenticular members consisting of different materials having different powers of refraction or different indices of dispersion for correcting aberrations of said lens elements.